United States Patent
Wu (10) Patent No.: US 10,268,911 B1
(45) Date of Patent: Apr. 23, 2019

(54) SYSTEM AND METHOD FOR LIVENESS DETECTION USING FACIAL LANDMARKS

(71) Applicant: MorphoTrust USA, LLC, Billerica, MA (US)

(72) Inventor: Yecheng Wu, Lexington, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 60 days.

(21) Appl. No.: 15/280,668

(22) Filed: Sep. 29, 2016

Related U.S. Application Data (60) Provisional application No. 62/234,167, filed on Sep. 29, 2015.

(51) Int. Cl.
   *G06K 9/00* (2006.01)

(52) U.S. Cl.
   CPC ..... *G06K 9/00906* (2013.01); *G06K 9/00248* (2013.01); *G06K 9/00261* (2013.01); *G06K 9/00281* (2013.01); *G06K 9/00288* (2013.01)

(58) Field of Classification Search
   CPC .. G06K 9/00228; G06K 9/36; G06K 9/00288; G06K 9/00906
   See application file for complete search history.

(56) References Cited

U.S. PATENT DOCUMENTS

| | | | | |
|---|---|---|---|---|
| 8,457,367 B1* | 6/2013 | Sipe | ............... | G06K 9/00221 382/118 |
| 8,542,879 B1* | 9/2013 | Nechyba | ............ | G06K 9/00228 382/103 |
| 2013/0188840 A1* | 7/2013 | Ma | .................. | G06K 9/00221 382/107 |
| 2014/0016837 A1* | 1/2014 | Nechyba | ............ | G06K 9/00228 382/118 |
| 2015/0169943 A1* | 6/2015 | Khitrov | ............. | G06K 9/00288 382/116 |

* cited by examiner

*Primary Examiner* — Chan S Park
*Assistant Examiner* — Mai H Tran
(74) *Attorney, Agent, or Firm* — Fish & Richardson P.C.

(57) ABSTRACT

Some implementations provide a computer-implemented method that include accessing image frames from a video sequence; detecting face of a subject in each image frame from the video sequence; detecting facial landmark features in the detected face; determining whether a sufficient number of facial landmark features and image frames have been obtained; in response to determining that a sufficient number of facial landmark features and image frames have been obtained, classifying detected facial landmark features from various detected image frames; quantifying variations of the classified facial landmark features across the detected image frames; correlating the quantified variations to a pre-determined threshold; and in response to determining that the quantified variations meet the pre-determined threshold, determining that the video sequence is from a live session.

19 Claims, 3 Drawing Sheets

SYSTEM AND METHOD FOR LIVENESS DETECTION USING FACIAL LANDMARKS

TECHNICAL FIELD

This document generally relates to the verification of on-line identities.

BACKGROUND

Transactions between two on-line parties may be subject to risks of identity theft, identity fraud, spoofing, phishing, etc., all of which may potentially hinder the flow of commerce.

SUMMARY

In one aspect, some implementations provide a computer-implemented method that includes: accessing image frames from a video sequence, the video sequence captured by a camera device to verify human presence; detecting a subject's face in in each image frame from the video sequence; detecting facial landmark features in the detected face of the subject; quantifying variations of the facial landmark features across the detected image frames; correlating the quantified variations to a pre-determined threshold; and in response to determining that the quantified variations meet the pre-determined threshold, determining that the video sequence is from a live session.

Implementations may include one or more of the following features.

The method may include, prior to quantifying variations of the facial landmark features, determining whether a sufficient number of facial landmark features and image frames have been obtained; in response to determining that a sufficient number of facial landmark features and image frames have been obtained, classifying detected facial landmark features from various detected image frames. The method include analyzing each image frame such that an orientation or shape factor for each classified facial landmark feature is determined.

Quantifying variations of the facial landmark features may include: comparing the determined orientation or shape factor for each classified facial landmark feature from more than one image frames in the video sequence. Quantifying variations of the facial landmark features may include: measuring a geometric relation between two classified facial landmark features from each image frame in the video sequence; and comparing the geometric relation as measured from image frames to quantify a variation in the video sequence. Quantifying variations of the facial landmark features may include: determining an illumination pattern on various observation points within a particular classified facial landmark feature; and comparing the illumination pattern for the particular classified facial landmark feature as determined from image frames to quantify a variation in the video sequence.

Correlating the quantified variations may include comparing a variation of each facial landmark feature across image frames within the video sequence with a threshold value specific to the particular facial landmark feature. Correlating the quantified variation may include comparing an ensemble of variations of facial landmark features within the video sequence with a threshold metric that is indicative of the combined facial landmark features.

In response to determining that the quantified variations does not meet the pre-determined threshold, determining that the video sequence is from a stale session. In response to determining that the quantified variations does not meet the pre-determined threshold, accessing more image frames from the video sequence for renewed variation analysis.

In another aspect, some implementations provide a mobile computing device, comprising a camera device and a processor, wherein the camera device is configured to capture a video sequence of image frames to verify human presence and the processor is configured to perform the operations of: accessing image frames from the video sequence; detecting a subject's face in each image frame from the video sequence; detecting facial landmark features in the detected face of the subject; quantifying variations of the facial landmark features across the detected image frames; correlating the quantified variations to a pre-determined threshold; and in response to determining that the quantified variations meet the pre-determined threshold, determining that the video sequence is from a live session.

Implementations may include one or more of the following features.

Prior to quantifying variations of the facial landmark features, the processor may be configured to perform the operations of: determining whether a sufficient number of facial landmark features and image frames have been obtained; in response to determining that a sufficient number of facial landmark features and image frames have been obtained, classifying detected facial landmark features from various detected image frames.

The processor may be configured to perform the operations of: analyzing each image frame to such that an orientation or shape factor for each classified facial landmark feature is determined.

Quantifying variations of the facial landmark features may include comparing the determined orientation or shape factor for each classified facial landmark feature from more than one image frames in the video sequence. Quantifying variations of the facial landmark features may include: measuring a geometric relation between two classified facial landmark features from each image frame in the video sequence; and comparing the geometric relation as measured from image frames to quantify a variation in the video sequence. Quantifying variations of the facial landmark features may include: determining an illumination pattern on various observation points within a particular classified facial landmark feature; comparing the illumination pattern for the particular classified facial landmark feature as determined from image frames to quantify a variation in the video sequence.

Correlating the quantified variations may include: comparing a variation of each facial landmark feature across image frames within the video sequence with a threshold value specific to the particular facial landmark feature. Correlating the quantified variation may include: comparing an ensemble of variations of facial landmark features within the video sequence with a threshold metric that is indicative of the combined facial landmark features.

The processor may be configured to perform the operations of: in response to determining that the quantified variations does not meet the pre-determined threshold, determining that the video sequence is from a stale session. The processor may be configured to perform the operations of: in response to determining that the quantified variations does not meet the pre-determined threshold, accessing more image frames from the video sequence for renewed variation analysis.

In yet another aspect, some implementations provide a computer-readable medium comprising software instructions, which when executed by one or more processors to perform the operations of: accessing image frames from a video sequence captured by a camera device to verify human presence; detecting a subject's face in in each image frame from the video sequence; detecting facial landmark features in the detected face of the subject; quantifying variations of the facial landmark features across the detected image frames; correlating the quantified variations to a pre-determined threshold; and in response to determining that the quantified variations meet the pre-determined threshold, determining that the video sequence is from a live session.

Some implementations may include one or more processors and instructions embedded in a non-transitory machine-readable medium that are executable by the one or more processors. The instructions, when executed, are configured to cause the one or more processors to perform the above described actions. The default position is not to use any external databases, but the system could be configured to perform a database check if needed.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Proof of identity may present a perennial challenge in our daily transactions. With the advent of the Internet, comes the age of e-commerce in which on-line transactions may replace in-person transactions. However, the sheer volume and complexity of these on-line transactions may give rise to a digital world fraught with peril, including, for example, identity theft, identity fraud, spoofing, phishing, etc. Notably, such risks may not be new in the Internet age, although the Internet may have amplified such risks. As the society moves towards cloud computing, more and more databases may become accessible. As connectivity becomes ubiquitous and as more visualization angles become available on accessible user platforms, facial landmarks can be analyzed and correlated. In addition, biometric data such as facial portrait data submitted on-line can be verified for liveness to deter or thwart spoofing attempts. In some implementations, the liveness verification can be conducted by leveraging the three-dimensional nature of facial landmarks in a facial portrait. Implementations disclosed herein may be extended to enterprise entities as well as financial institutions.

Some illustrative implementations may leverage the video processing capabilities on a mobile device. For example, the mobile device of a user may include a camera device. When taking a facial portrait of the user, the camera device may initially obtain a sequence of images of the user, for instance, during a scout scan. In some implementations, each image frame in the obtained video sequence may be analyzed. Particularly, the face of the subject may be detected in each image frame. Further, the facial features on the face may be detected. Such facial features may include the forehead, the noise, the eye brows, the iris's, the eye corners, the nostrils, the cheek, etc. After enough samples have been collected, the stored facial landmarks can be analyzed and compared to each other. A statistical analysis may be performed on the facial landmarks. The number of image frames for the analysis may be based on the video frame rate to allow the camera device of the mobile device sufficient time to capture face movement for liveness determination. If the variation of certain facial landmarks between image frames is greater than a predefined threshold level, then the images are more likely than not taken from a real three-dimensional face. Otherwise, the images are more likely than not taken from a static two-dimensional image, indicating a likely spoofing attempt. In this context, the liveness detection refers to a prudent, and yet stealthy, detection of whether the session is a live one with an active user rather than a third party pretending to be the user. The detection is performed without indicating to the user that the detection sequence is being performed. Indeed, implementations disclosed herein are not limited to on-line registration or enrollment for identification documents. In some instances, a user may aspire to obtain physical access to a building. A camera device at building entrance may inspect the visitor in a manner that counters spoofing attacks. This feature would be advantageously incorporated by on-campus school buildings, member-only club-houses, condominium or apartment entrances, parking space entrances, hotel rooms, entrance to branch offices of banks after hours. In fact, the feature may be implemented by any gate keeper to effectuate physical access control such that a visitor cannot obtain access by flashing a photo (or biometric record) of an authorized person. The implementations may be extended to access to mobile properties. In one example, the feature can be implemented as an electronic control to lock/unlock the door of a car or vehicle, when a person aspires to enter the car or vehicle.

Figure 1:
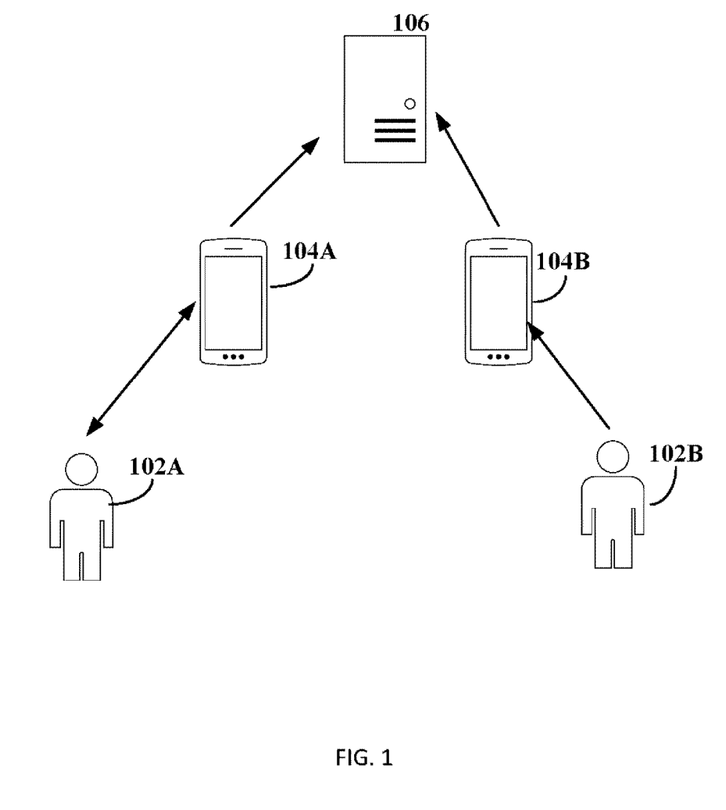
FIG. 1 is a diagram showing an example of a hierarchy for handling user authentication from the mobile devices of the user.

For general context, FIG. 1 is a diagram showing an example of a hierarchy for handling user authentication from the mobile devices of the user. Users 102A and 102B may each have mobile devices 104A and 104B respectively. Here, the mobile devices 104A and 104B may be registered to users 102A and 102B, respectively. Example mobile devices 104A and 104B may include smartphones, tablets, laptops, etc. Mobile devices 104A and 104B may further seek to communicate with server 106 to authenticate user requests submitted from mobile devices 104A and 104B.

Here, instead of patronizing a post office to renew a passport (or going to a department of mobile vehicle's office to renew a driver's license), a user may choose to renew an identification document, such as a passport or a driver's license remotely. In one instance, when mobile devices 104A and 104B include smartphone devices, an app installed on the smartphone device may walk the user through an on-line renewal process. In this instance, the app may ask the user to submit a recent photo and may invoke a camera device on the smartphone to take a facial portrait of the user. The remote operation nature raises the concern of fraudulent submission in the context of identity management. For illustration, the photo submitted can be a facial portrait of a different person and for the sole purpose of stealing the identity of the original person. Such risks may also include a phishing attack.

To counter such risks inherent with remote operations, the app may leverage a video sequence taken from the camera device by analyzing image frames from the video sequence to determine that the video sequence is part of a live session and is not a static image, for example, for a static replay attack.

In this example, the analysis of the video frame may be performed at the smartphone device. Once the analysis confirmed the liveness of the video sequence, the facial portrait taken in association with the video sequence may be submitted to server 106 for registration and renewal of the identification document. If the registration is successful, server 106 may issue a renewed identification document. For example, server 106 may cause a renewal copy to be mailed to the user. Server 106 may also arrange to have a renewed digital identification document to be installed on user device. Notably, in some implementations, analyzing the video frame may be performed at the server.

Figure 2:
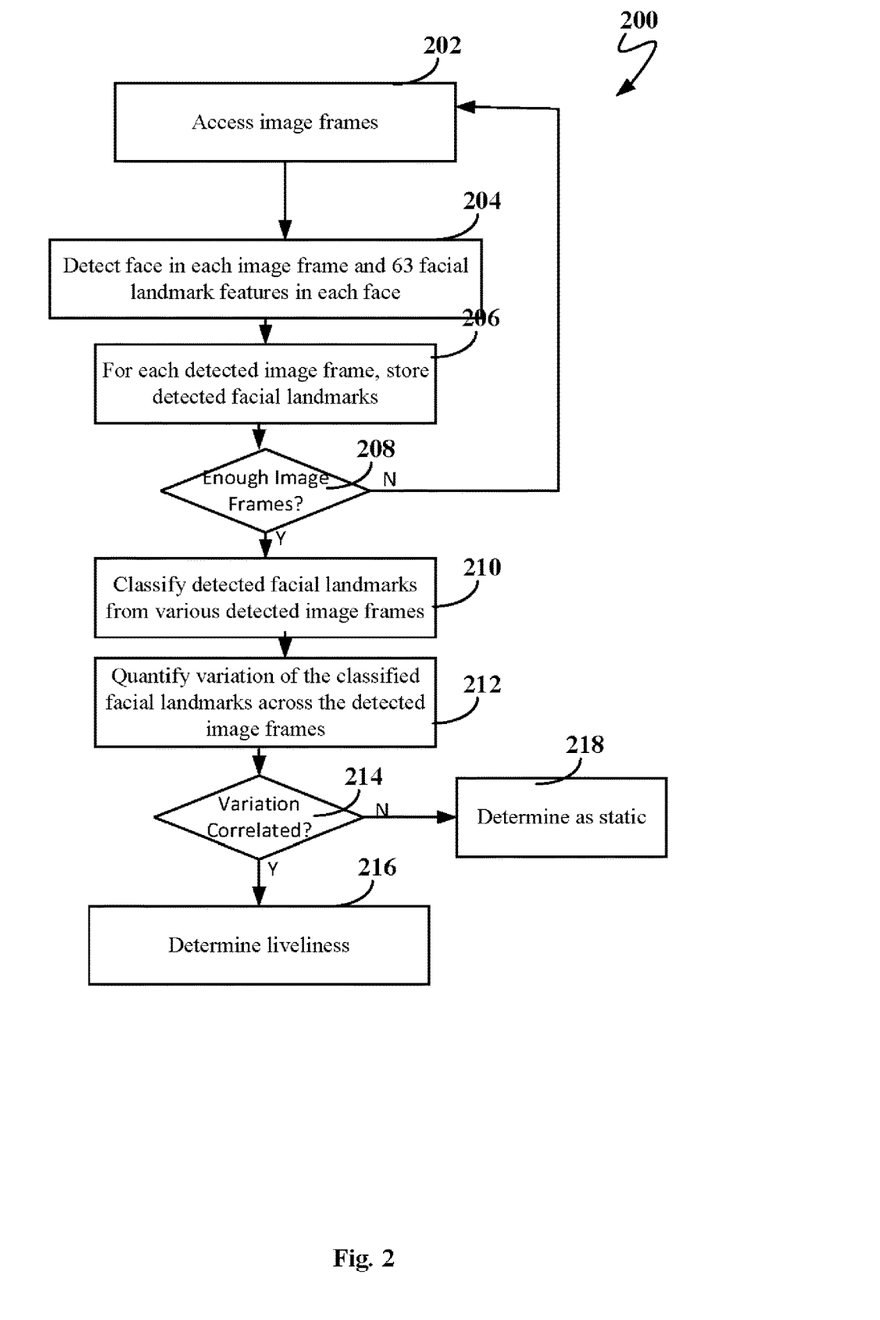
FIG. 2 is a flow chart for an example of verifying liveness of a user authentication request from a mobile device.

FIG. 2 is a flow chart 200 for an example of verifying liveness of a user authentication request from a mobile device. In this example, the mobile device may initially engage an on-board camera device to obtain a video sequence, for example, as part of a scout scan during a selfie photo session. The mobile device may first access the image frames (202) by extracting individual frames from the video sequence. Here, the video sequence may be from a video stream (for example, as determined by Nation Television System Committee-NTSC, or as determined by the video communication standard H.261). In some implementations, for efficiency of communication, only a portion of the captured video stream may be transmitted, for example, to server 106 and in accordance with adaptive video codec specification of H.261. The extraction may lead to detection of face in each image frame and many facial landmark features (e.g., 63 facial landmark features) in each face (204). For each extracted image frame, the detected facial landmarks may be stored (206). Subsequently, a determination is made as to whether sufficient image frames have been obtained (208). The determination may be rendered in view of the frame rate of the video sequence. If the number of image frames are insufficient, more image frames from the video sequence may be obtained. If the number of image frames from the video sequence are enough, the detected facial landmarks from various detected image frames may be classified (210). The classification may include grouping the same facial landmark features from various detected image frames. The classified facial landmarks may then be quantified across the various detected image frames (212). The classification may yield detected variations from the various image frames. The variations may be correlated with, for example, a predetermined threshold (214). Here, the variation may include spatial relationship of the facial landmarks between image frames and with respect to each other. The correlation may generate statistics from the landmarks. Based on the fundamental differences between a three-dimensional live person and a two-dimensional still image, the relationship between facial landmarks of a live person from a series of image frames will have characteristics different from the landmarks of a still image. For example, the distance between certain landmarks, sizes of certain facial features, angles between certain landmarks, relative location change of certain landmarks will change when the person moves either the face or the camera. These same measurements will change less between image frames because the image is static and two-dimensional.

After the correlation, if the variations are within the predetermined threshold, the image frames may be determined as static. If the variations are not within the predetermined threshold, the image frames may be determined as from a liveness session. In other words, if the changes of particular landmark features (such as the nose) agree with expected changes in size or orientation, the image frames and associated facial portrait photos are determined as from a live person, and not from a static picture or from a static computer screen. Here, a scoring mechanism may be implemented to quantify the degree of match detected chances in size and orientation for each facial landmark and the expected change for that facial landmark. The degree of match may depend on the context and hence can vary from application to application. For example, the degree of match may depend on the nature of the underlying transaction or the dollar amount involved in the underlying transaction.

Figure 3A:
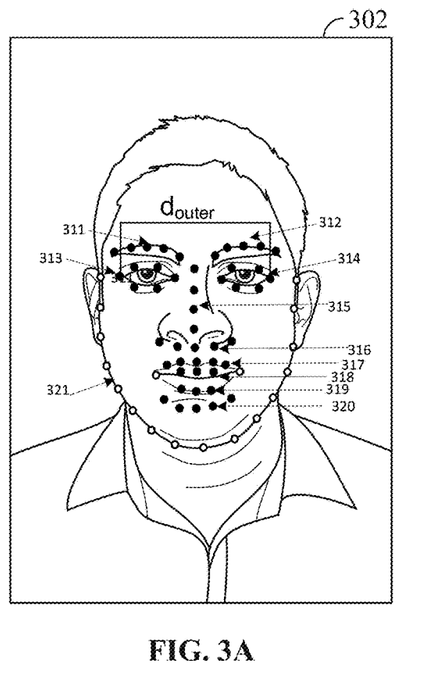
FIGS. 3A-3C illustrate examples of verifying liveness when authenticating a facial biometric as submitted by a user from a mobile device.
Figure 3B:
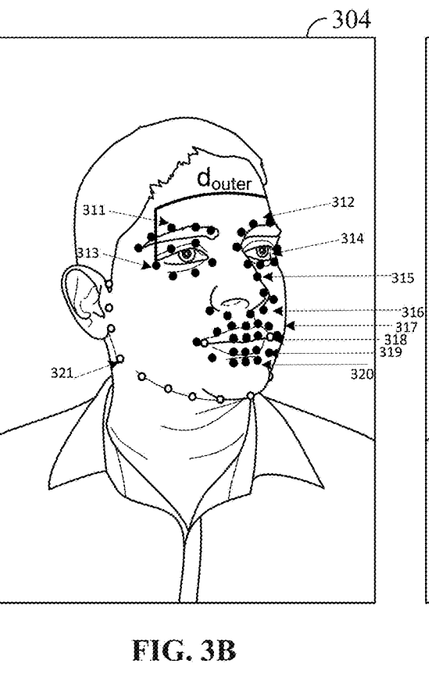
Figure 3C:
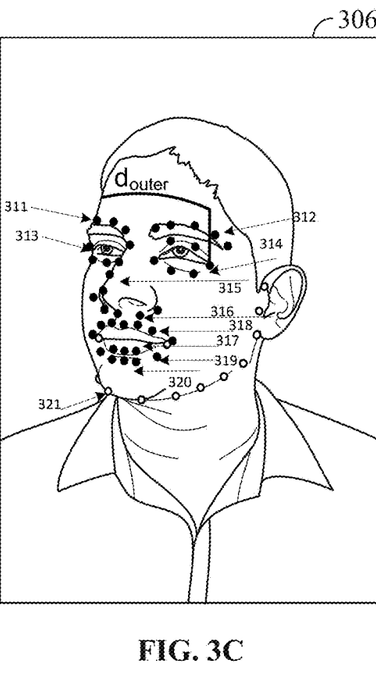

FIGS. 3A-3C illustrate examples of verifying liveness when authenticating a facial biometric as submitted by a user from a mobile device. In particular, the facial portraits 302 to 306 are from one illustrative video sequence. In some instances, the video sequence may be derived from a scanning sequence in which a number of shots of the subject's face are taken from varying angles on the same scanning path. In these instances, the shots are from varying angles on an arc or a straight line segment. These shots can be taken sequentially from the arc or line segment. In some examples, these shots can be taken during a calibration phase before the mobile device, for example, an iPhone, captures a photo of the user for further processing. In these examples, further processing can include additional processing on the mobile device to render the photo more aesthetically pleasant. Further processing may also include priming the photo for online submit for the purposes of obtaining an identification document. Here, the facial portraits from a live session reflect the face of the subject at various angles on this arc or line segment. Due to slight changes in viewing angles of the facial portrait, the apparent orientation and size of each facial landmark varies. For example, the nose feature 308A in images 302 to 306 are viewed from slightly different angles. The orientation and size of nose feature 308A is expected to change accordingly in images 302 to 306. Likewise, the orientation and size of other facial landmark features, such as the forehead, the eye brows, the eyes, the eye corners, the lips, and the mouths, are all expected to vary. Each landmark feature may be associated with one commensurate change in orientation and size.

In more detail, five observation points 311 can be placed on the right eyebrow—from the peripheral right side to the nostril center. Similarly, five observation points 312 can be placed on the left eyebrow—from the peripheral left side to nostril center. The placement of these observation points can be automatic. The automatic placement process can include automatically distributing the points on a segmented landmark—such as the eyebrow. The distribution can be the result of operator-led training. For example, the distribution may be the result of an artificial intelligence program learning from placement results drawn by human operators. The distribution can also be the result of optimizing heuristics of placement, for example, the degree of even spacing, the need to place more points on more curvy segments. While these observations points may be readily available at various viewing angles, their collective geometrical configuration can be used to estimate an orientation or shape factor of a lateral eyebrow. In this illustration, the orientation and shape factor for the same set of observation points differ from positions 302 to 304. The orientation factor refers to a geometric angle formed by the constituent points from observation points 311 and 312 at these positions. The shape factor refers a geometric trajectory formed by the constituent points from observation points 311 and 312 at these positions. In other words, despite slight variations in viewing angles from positions 302 to 304, the orientation and shape factor for the five observation points within each landmark segment are different. In fact, not all five constituent observation points are available throughout positions 302 to 304. The differentiation may also include illumination variations among the positions. Within each position, the illumination pattern for each constituent point may also be different. If such differentiations are indeed observed, then the image sequence is more likely taken from a 3D object, rather than a 2D static image.

As expected, there will be individual variations. Some people may have a more flat tempo. Some may have more rounded tempo or a more distinct silhouette. Therefore, relying on one landmark, such as the eyebrow, may not be sufficient even when both lateral sides are included. Indeed, some implementations factor in various landmarks.

Some implementations include observation points for eyelids, both upper and lower, for both right (313) eye and left (314) eye. The upper eyelids in 313 and 314 are represented by four constituent observation points. The lower eyelids in 313 and 314 are also represented by four constituent observation points. The upper eyelids and lower eyelids share outer edges, the separation of which is denoted as d_outer as illustrated in FIGS. 3A-3C. As discussed above, orientation and shape factor may include the measured outer diameter that corresponds to d_outer. In this illustration, measured d_outer varies across the three positions from 302 to 304 resulting from the 3D nature of the frontal facial object. Compared to an inner diameter that measures the separation of the inner edges of both eyes, the outer edge metric may be preferred for being more sensitive to angle variations amongst these three positions. Likewise, the width of each eyelid may not be as sensitive to angular variation of positions 302 to 304 as the parameter of d_outer. Between these positions, the apparent curvature of the upper lid and lower lid may vary. Within each position, the illumination patter for each constituent point may also vary. These orientation and shape factor may be considered in confirming the 3D nature of the front facial object.

In another example, observation points from the central nose ridge (315) or the lateral nostrils (316) may be considered. In particular, the nose landmark represents both a vertical component—as seen from the nose ridge (315) and a horizontal component—as seen from the nostril (316). The orthogonal aspect can render the component complementary to each other. In particular, at position 302, nose ridge 315 may have observation points aligned in a downright vertical manner while in other positions of 304 and 306, the observation points on nose ridge 315 may exhibit a tilt angle. At the same time, at position 302, the observation points on nostrils 316 are laid out in a spline shape in a substantially horizontal manner. Meanwhile, at positions 304 and 306, the spline shape formed by these observation points on nostrils 316 exhibits a slanted angle deviating from the substantially horizontal shape. For this landmark, if the images are from a 3D object, not only should the nose ridge 315 and nostril 316 exhibit variations in orientation and shape from different positions 302, 304, and 306, these variations for nose ridge 315 and nostril 316 should also be complementary by virtue of orthogonality.

The lips provide yet another example. Here, upper lip edge 317 and lower lip edge 319 respectively exhibit convex and concave shapes while the lips 318 follow a more monotonic horizontal path. In particular, the observation points on upper lip edge 317 are more horizontally distributed at position 302 than at positions 304 and 306 where more slanted angles are shown. Notably, observation points on lower lip edge 319 are also more horizontally distributed at position 302 than at positions 304 and 306, except that the observation points on the lower lip edge 319 remain more concave in shape than those on the upper lip edge 317. Likewise, observation points on lips 318 are also more horizontally distributed at position 302 than at positions 304 and 306, except that the observation points on lips 318 remain more straight (or less curvy) than observation points on the upper lip edge 317 and lower lip edge 319. These relative and collective features of observation points on various portions of this landmark can be uniquely analyzed to aid the determination of whether the image sequence comes from a live session in which 3D object is being scanned.

Upper chin area 320 and facial contour 321 may include various observation points that track the respective shapes. As to upper chin area 320, the observation points are generally located on an indented area. The illumination pattern from each observation point can vary within each position (from position 302 to 306). The aggregative illumination patterns for the observation points at position 302 can be more homogeneous than the aggregative illumination patterns at positions 302 and 304, with some observation points becoming out of sight. Likewise, facial contours 321 at position 302 may include more observation points to form a longer arc than at positions 304 and 306. Here, metrics such as length of arc or number of visible observation points may be used for comparison of this landmark as measured from positions 302 to 306. These metrics can benchmark observation points from various positions so that the 3D nature of the frontal facial object can be determined fairly reliably. In cases of spoofing attempt that uses a static past photo, these metrics may exhibit no or little variation from different positions.

The metrics of each landmark can be measured individually for each landmark. The measured metrics for each landmark can be compared across the various positions to determine if the variation is more than a threshold amount. As there are more than one landmarks, comparison of metrics from the landmarks can be viewed as a whole against a combined threshold. In some instances, comparison results from various landmarks can be weighed so that the contribution from each landmark feature is analyzed in view of other landmark features. In this manner, no landmark feature may be determinative so that even if one particular landmark feature may render inoperative analytic results, the determination can be performed by viewing other landmark features. In these instances, the weight accorded to each landmark feature can be adaptive determined beforehand, for example, through a machine learning algorithm.

The threshold of expected change may be a combination of all expected changes for the landmark features. As noted above, the threshold may be application-specific. For example, for transaction involving dollar amounts under a particular level, the comparison may be less sophisticated in order to determine that the session is live and the submitted facial biometric is genuine. Otherwise, when the transaction involves a paramount identification document, for example, renewal of passport, the comparison may involve a more comprehensively determined threshold.

Due to lack of automated liveness detection technologies, most of the enrollment processes are performed in front a human operator. This presence of a human operator generally requires a trained operator to run the system and the user to travel to the specific place. The process can be time consuming and costly. An automated process, especially one such process run remotely, may suffer from lack of liveness detection. This absence of liveness detection can give rise to access by an unauthorized party access to a secured system when spoofing images or videos are used. Disclosures here in can mitigate such risks by identifying potentially suspicious spoofing when the customers capture the images themselves. These detection methods can provide a measure for the liveness confidence level to indicate whether the photo is taken directly from a live person or from a still image displayed on a computer screen or in prints. Such methods can enhance the security of identify related applications, such as remoted renewal of identification document, remote login using facial biometric data, remote access to financial account using facial biometric. The enhancement can manifest as reduced risk of altered or spoofed images and hence image related identity fraud. Some implementations disclosed herein can detected liveness seamlessly and without user awareness (e.g., directing the user to make any specific moves during the image capturing process). The stealth feature can be leveraged to further isolate liveness detection from an on-line identity management session.

Various implementations of systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device such as a touchscreen device that functions as an interface of display and user input. The display device may also include a CRT (cathode ray tube), LCD (liquid crystal display) monitor, LED (light-emitting diode) or OLED (organic light-emitting diode) monitors). The user input device can include a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The client can run on a mobile device of a user. The mobile device may be operated by iOS, Android, or other mobile operating systems (OS). The relationship of client and server arises by virtue of computer programs running on the respective computers and having a client-server relationship to each other.

A number of implementations have been described. Nevertheless, it will be understood that various modifications may be made without departing from the spirit and scope of the disclosure. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
   accessing image frames from a video sequence, the video sequence captured by a camera device to verify human presence;
   detecting a subject's face in in each image frame from the video sequence;
   detecting facial landmark features in the detected face of the subject;
   quantifying variations of the facial landmark features across the image frames;

correlating the quantified variations to a pre-determined threshold comprising:
obtaining, for each of the facial landmark features, a corresponding weight and corresponding pre-determined threshold variation for such feature;
determining, for each of the facial landmark features, whether the quantified variation of the facial landmark feature across the detected image frames satisfies the corresponding pre-determined threshold variation for such feature for the facial landmark feature; and
determining that the quantified variations meet the pre-determined threshold based at least on determining that the pre-determined threshold is satisfied by a combination of the weights for each of the facial landmark features for which the quantified variation of the facial landmark feature across the detected image frames was determined to satisfy the corresponding pre-determined threshold variation for such feature for the facial landmark feature; and
in response to determining that the quantified variations meet the pre-determined threshold, determining that the video sequence is from a live session.

2. The method of claim 1, further comprising:
prior to quantifying variations of the facial landmark features:
determining whether a sufficient number of facial landmark features and image frames have been obtained; and
in response to determining that a sufficient number of facial landmark features and image frames have been obtained, classifying detected facial landmark features from various detected image frames.

3. The method of claim 2, further comprising:
analyzing each image frame such that an orientation or shape factor for each classified facial landmark feature is determined.

4. The method of claim 3, wherein quantifying variations of the facial landmark features comprises:
comparing the determined orientation or shape factor for each classified facial landmark feature from more than one image frames in the video sequence.

5. The method of claim 3, wherein quantifying variations of the facial landmark features comprises:
measuring a geometric relation between two classified facial landmark features from each image frame in the video sequence; and
comparing the geometric relation as measured from image frames to quantify a variation in the video sequence.

6. The method of claim 3, wherein quantifying variations of the facial landmark features comprises:
determining an illumination pattern on various observation points within a particular classified facial landmark feature; and
comparing the illumination pattern for the particular classified facial landmark feature as determined from image frames to quantify a variation in the video sequence.

7. The method of claim 1, wherein correlating the quantified variations comprises:
comparing the quantified variation of each facial landmark feature across image frames within the video sequence with the predetermined threshold variation for such feature specific to the particular facial landmark feature.

8. The method of claim 1, further comprising:
in response to determining that the quantified variations does not meet the pre-determined threshold, determining that the video sequence is from a stale session.

9. The method of claim 1, further comprising:
in response to determining that the quantified variations does not meet the pre-determined threshold, accessing more image frames from the video sequence for renewed variation analysis.

10. A mobile computing device, comprising a camera device and a processor, wherein the camera device is configured to capture a video sequence of image frames to verify human presence and the processor is configured to perform the operations of:
accessing image frames from the video sequence;
detecting a subject's face in each image frame from the video sequence;
detecting facial landmark features in the detected face of the subject;
quantifying variations of the facial landmark features across the image frames;
correlating the quantified variations to a pre-determined threshold comprising:
obtaining, for each of the facial landmark features, a corresponding weight and corresponding pre-determined threshold variation for such feature;
determining, for each of the facial landmark features, whether the quantified variation of the facial landmark feature across the detected image frames satisfies the corresponding pre-determined threshold variation for such feature for the facial landmark feature; and
determining that the quantified variations meet the pre-determined threshold based at least on determining that the pre-determined threshold is satisfied by a combination of the weights for each of the facial landmark features for which the quantified variation of the facial landmark feature across the detected image frames was determined to satisfy the corresponding pre-determined threshold variation for such feature for the facial landmark feature; and
in response to determining that the quantified variations meet the pre-determined threshold, determining that the video sequence is from a live session.

11. The mobile computing device of claim 10, wherein prior to quantifying variations of the facial landmark features, the processor is configured to perform the operations of:
determining whether a sufficient number of facial landmark features and image frames have been obtained; and
in response to determining that a sufficient number of facial landmark features and image frames have been obtained, classifying detected facial landmark features from various detected image frames.

12. The mobile computing device of claim 11, the processor is configured to perform the operations of:
analyzing each image frame to such that an orientation or shape factor for each classified facial landmark feature is determined.

13. The mobile computing device of claim 12, wherein quantifying variations of the facial landmark features comprises:
comparing the determined orientation or shape factor for each classified facial landmark feature from more than one image frames in the video sequence.

14. The mobile computing device of claim 12, wherein quantifying variations of the facial landmark features comprises:
   measuring a geometric relation between two classified facial landmark features from each image frame in the video sequence; and
   comparing the geometric relation as measured from image frames to quantify a variation in the video sequence.

15. The mobile computing device of claim 12, wherein quantifying variations of the facial landmark features comprises:
   determining an illumination pattern on various observation points within a particular classified facial landmark feature; and
   comparing the illumination pattern for the particular classified facial landmark feature as determined from image frames to quantify a variation in the video sequence.

16. The mobile computing device of claim 10, wherein correlating the quantified variations comprises:
   comparing the quantified variation of each facial landmark feature across image frames within the video sequence with the predetermined threshold variation for such feature specific to the particular facial landmark feature.

17. The mobile computing device of claim 10, wherein the processor is configured to perform the operations of:
   in response to determining that the quantified variations does not meet the pre-determined threshold, determining that the video sequence is from a stale session.

18. A non-transitory computer-readable medium comprising software instructions, which when executed by one or more processors to perform the operations of:
   accessing image frames from a video sequence captured by a camera device to verify human presence;
   detecting a subject's face in in each image frame from the video sequence;
   detecting facial landmark features in the detected face of the subject;
   quantifying variations of the facial landmark features across the image frames;
   correlating the quantified variations to a pre-determined threshold comprising:
      obtaining, for each of the facial landmark features, a corresponding weight and corresponding pre-determined threshold variation for such feature;
      determining, for each of the facial landmark features, whether the quantified variation of the facial landmark feature across the detected image frames satisfies the corresponding pre-determined threshold variation for such feature for the facial landmark feature; and
      determining that the quantified variations meet the pre-determined threshold based at least on determining that the pre-determined threshold is satisfied by a combination of the weights for each of the facial landmark features for which the quantified variation of the facial landmark feature across the detected image frames was determined to satisfy the corresponding pre-determined threshold variation for such feature for the facial landmark feature; and
   in response to determining that the quantified variations meet the pre-determined threshold, determining that the video sequence is from a live session.

19. The method of claim 1, wherein the facial landmark features comprise at least a nose and an eye brow of the detected face.

* * * * *